(12) United States Patent
Granestrand et al.

(10) Patent No.: US 6,181,860 B1
(45) Date of Patent: Jan. 30, 2001

(54) OPTICAL WAVEGUIDE DESIGNED TO FACILITATE CONNECTIONS WITH OPTICAL COMPONENTRY AND FIBERS

(75) Inventors: Per Olov Granestrand, Tyresö; Per Johan Olof Svensson, Sundbyberg, both of (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 09/033,859

(22) Filed: Mar. 3, 1998

(30) Foreign Application Priority Data

Mar. 3, 1997 (SE) .................................... 9700754

(51) Int. Cl.7 .................................................... G02B 6/10
(52) U.S. Cl. ............................ 385/129; 385/130; 385/43; 385/49
(58) Field of Search ..................................... 385/129–132, 385/43, 49, 50, 46, 44, 45, 39, 31, 37

(56) References Cited

U.S. PATENT DOCUMENTS

| | | | | |
|---|---|---|---|---|
| 4,262,995 | * | 4/1981 | Tangonan | 385/43 |
| 5,058,978 | * | 10/1991 | Kondoh et al. | 385/43 |
| 5,838,853 | * | 11/1998 | Jinnai et al. | 385/43 |
| 5,841,919 | * | 11/1998 | Akiba et al. | 385/37 |
| 5,926,298 | * | 10/1999 | Li | 385/43 |

* cited by examiner

Primary Examiner—Hemang Sanghavi

(57) ABSTRACT

The present invention relates to an optical waveguide (1) comprising a transition portion in at least one connection end for connection with an optical component. The transition portion is arranged in such a way that the waveguide at first changes over into a widening portion (15) which in turn changes over into a tooth structure (10), where said tooth structure (10) is intended to be connected to said optical component.

13 Claims, 1 Drawing Sheet

OPTICAL WAVEGUIDE DESIGNED TO FACILITATE CONNECTIONS WITH OPTICAL COMPONENTRY AND FIBERS

TECHNICAL FIELD

The present invention relates to an optical waveguide having a structure which facilitates and improves its connection to an optical fiber.

STATE OF THE ART

One of the fundamental requirements in the construction of communication network systems comprising optoelectronic components is that a connection between components a single mode fiber should take place with as small a loss as possible. In general, most of a connection loss depends on the difference in size between the optical fiber and the waveguide. When the optical waveguide is made of a semiconductor material, the loss at the interface between the waveguide and the fiber can, in certain cases, be as much as 10 dB.

By increasing the dimension of the optical field of the waveguide a better correspondence with the optical field of the fiber is achieved, whereby the connection loss in the interface between waveguide and fiber is reduced. A number of different arrangements and processes to increase the optical field of the waveguide are known.

One way of converting the optical field in the waveguide is to arrange lenses in the interface between the fiber and the waveguide. This method is, however, rather impractical.

Another way of achieving the above mentioned converting is to transform the dimensions of the waveguide in the interface with the fiber. Said transformation is generally called tapering. Tapering can occur either through the dimension of the waveguide being increased or reduced in order to increase the optical field. Minimizing the dimension is, however, connected with practical difficulties when the dimension of the single mode waveguide is tremendously small to begin with. A more common way is therefore to increase the dimension of the waveguide. This increase in the dimension can take place laterally, vertically or laterally and vertically together, where the vertical tapering can comprise complicated process steps which make manufacturing relatively expensive.

SUMMARY OF THE INVENTION

In a transition from a waveguide, defined for example in a or some semiconductor materials or some polymer material, to an optical fiber, there are many factors which play a decisive role in maintaining the intensity of the light. One of these factors relates how the optical fields of the waveguide and now the optical fiber are adapted to each other.

The solutions which are available today often solve said problem through increasing the dimension of the waveguide in the connection to the fiber. Said increase in the dimension is required both laterally and vertically in relation to an optical axis defined in the waveguide in order for the adaption of the field to be satisfactory. From a process point of view said increase in the dimension of the waveguide is relatively complicated, especially in the vertical direction, which can be a problem.

The present invention tackles the above mentioned problem by arrangins the waveguide with a so-called tooth-structure in its connection with the fiber.

The structure of the waveguide in its connection with the fiber can thereby be said to be a combination of both a so-called up-tapering and a down-tapering. By up-tapering is meant that the dimension is increased in at least one orthogonal direction towards the so-called optical axis defined in the waveguide, and with down-tapering is meant that the dimension is miminized in at least one orthogonal direction towards said optical axis.

The physical effect of an up-tapering in an orthogonal direction in relation to the optical axis is that the optical field increases in the same direction as the up-tapering and that the optical field in the other orthogonal direction towards the optical axis remains relatively undisturbed.

The physical effect of a down-tapering in an orthogonal direction in relation to the optical axis is that the optical field increases in both the orthogonal directions towards the optical axis, if said down-tapering makes the cross-section of the waveguide become sufficiently small. The optical field increases, seen relatively, more in the tapered direction, in this case the narrowing direction, compared with the untapered.

By means of said structure, when connecting the wave guide to the fiber, an increase in the optical field in both orthogonal directions towards the optical axis is obtained without it being necessary for this purpose to change the dimension in both said orthogonal directions.

The purpose of the present invention is to increase the optical field in a waveguide in both orthogonal directions in relation to the optical axis through only rearranging the size and structure in one of said orthogonal directions.

An advantage of the present invention is that the connection loss can be held to a low level.

Another advantage of the present invention is that aligning the optical fiber and the optical waveguide can be facilitated.

Yet another advantage of the present invention is that production can be relatively cheap.

A further advantage of the present invention is that it can be applied to waveguides manufactured from semiconductor material, polymer material and quartz.

The invention will now be described in more detail with the help of preferred embodiments and with reference to the appended drawing.

PREFERRED EMBODIMENTS

Figure 1:
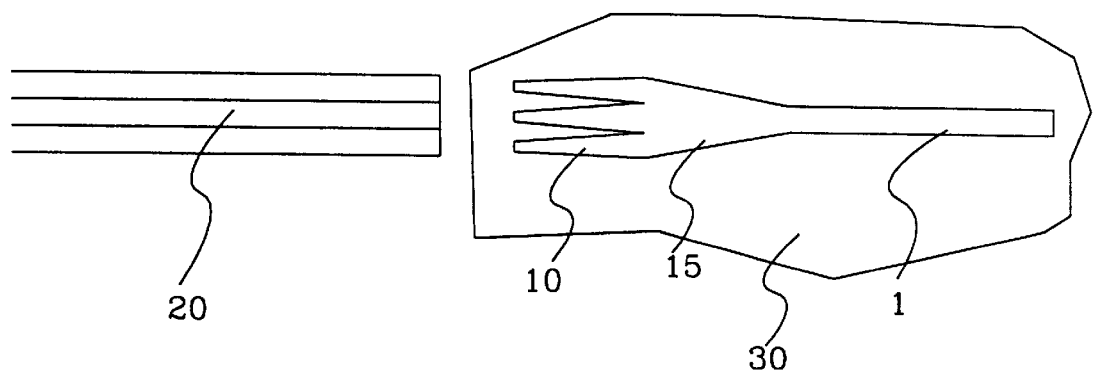
FIG. 1 shows a view from above of a first embodiment of the invention.

FIG. 1 shows a view from above of a waveguide 1 according to the invention.

The waveguide 1 is arranged at one end with a transition portion in order to increase the optical field from the waveguide. The transition portion comprises a first part in which the waveguide is widened in a plane which corresponds to a surface on a substrate on which the waveguide is arranged. The widening 15 in turn changes over into a tooth structure 10. The above mentioned transition portion consequently comprises the widening 15 and the tooth structure 10. This can generally be called a "taper".

The above mentioned widening portion 15 can, for example, be parabolic or linearly shaped.

The number of teeth in the tooth structure 10 in FIG. 1 is three. This number is naturally only an example, however the number should be at least two in order to achieve the required changes in the optical field of the waveguide 1 and in order not to lose the simplicity in aligning against, for example, an optical fiber 20. Said teeth can be given different shapes. What is common for them is that they all have a shape which in the main is conical. It is conceivable that certain teeth in the tooth structure are given a different shape in relation to the others.

The free end of each tooth can either be pointed or flat.

The distance between each tooth in the tooth structure 10 in FIG. 1 is the same. It is naturally possible to arrange a tooth structure 10 in which the distances between different adjacent teeth have different mutual distances in relation to each other.

Figure 2:
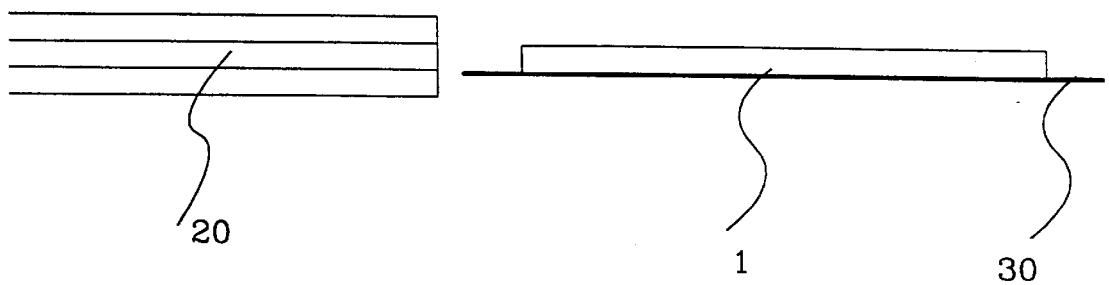
FIG. 2 shows a lateral view of the invention according to FIGS. 1 and 3.

FIG. 2 is a view from the side of the same waveguide 1 which is shown in FIG. 1. This Figure shows that the waveguide 1, the widening 15 and the tooth structure 10 have the same height from the surface 30 upon which they are arranged.

The material in the waveguide 1 and thereby the widening 15 and the tooth structure 10 can be of polymer, quartz or semiconductor type.

Figure 3:
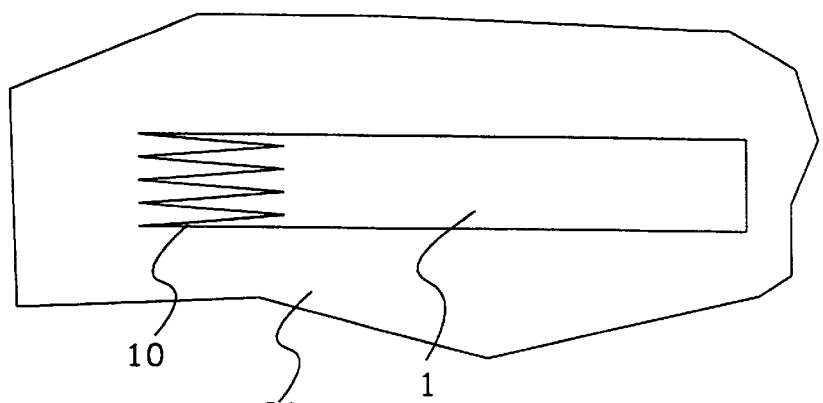
FIG. 3 shows a view from above of a second embodiment of the invention.

FIG. 3 shows another embodiment of a waveguide according to the invention. In this embodiment the waveguide neither tapers up nor tapers down in the proper sense. In at least one of the ends of the waveguide a tooth structure is arranged. The tooth structure comprises, as mentioned above, preferably at least two teeth so that the simplification of the alignment against another optical unit shall not be lost. The size and the shape of the teeth can be the same or different. The distances between the teeth can be the same or different.

The material in this embodiment can, like the other embodiments, be of quartz, polymer or semiconductor type.

The process for manufacturing these waveguides can take place through the use of techniques well known to the are skilled in the art and therefore does not need to be described more closely.

The invention is naturally not limited to the embodiments described above and shown in the drawings but can be modified within the scope of the appended claims.

What is claimed is:

1. An optical waveguide comprising a transition portion in at least one connection end for enabling connection with a single optical component, said transition portion being arranged to include a widening portion increasing in width and leading to a tooth structure, where said tooth structure is capable of interfacing said single optical component, wherein the widening portion is arranged in a plane which is parallel to a surface on a substrate where the waveguide is arranged, wherein the waveguide with the widening portion and the tooth structure are equally high in relation to the surface of the substrate on which they are arranged, wherein the material in the waveguide is polymer, wherein the tooth structure comprises at least two teeth, wherein said at least two teeth taper to decreasing width in a direction going away from the widening portion, wherein the teeth in the tooth structure have different shapes and size in relation to each other.

2. The optical waveguide of claim 1, wherein the widening portion linearly increases in width.

3. The optical waveguide of claim 1, wherein the widening portion parabolically increases in width.

4. An optical waveguide having a transition portion comprising:

a plurality of teeth:

a widening portion increasing in width and leading to a tooth structure including the plurality of teeth, wherein at least one tooth in the plurality of teeth has a different shape in relation to the remaining of the plurality of teeth, and wherein the plurality of teeth taper to decreasing width in a direction going away from the widening portion.

5. The optical waveguide of claim 4, wherein the widening portion linearly increases in width.

6. The optical waveguide according to claim 5, wherein the teeth in the tooth structure are uniformly spaced.

7. The optical waveguide of claim 4, wherein the plurality of teeth comprise at least three teeth and wherein the distances between different adjacent teeth have different mutual distances in relation to each other.

8. The optical waveguide of claim 4, wherein a material in the waveguide is one of polymer, semiconductor type, and quartz.

9. The optical waveguide of claim 4, wherein the widening portion parabolically increases in width.

10. An optical waveguide having at least one connection end comprising a tooth structure having a plurality of teeth, wherein the tooth structure is equally high with other portions of the waveguide relative to a surface of a substrate on which the waveguide is arranged, wherein the plurality of teeth taper to decreasing width in a direction farther along the length of the teeth, and wherein at least one tooth in the plurality of teeth has a different shape in relation to the remaining of the plurality of teeth.

11. The optical waveguide according to claim 1, wherein the teeth in the tooth structure are uniformly spaced.

12. The optical waveguide of claim 1, wherein the plurality of teeth comprise at least three teeth and wherein the distances between different adjacent teeth have different mutual distances in relation to each other.

13. The optical waveguide of claim 1, wherein a material in the waveguide is one of polymer, semiconductor type, and quartz.

* * * * *